United States Patent [19]
Maggioni et al.

[11] Patent Number: 5,751,843
[45] Date of Patent: May 12, 1998

[54] METHOD FOR DETECTING THE SPATIAL POSITION AND ROTATIONAL POSITION OF SUITABLY MARKED OBJECTS IN DIGITAL IMAGE SEQUENCES

[75] Inventors: Christoph Maggioni; Brigitte Wirtz, both of München, Germany

[73] Assignee: Siemens Aktiengesellschaft, Munich, Germany

[21] Appl. No.: 596,283

[22] PCT Filed: Aug. 1, 1994

[86] PCT No.: PCT/DE94/00893

§ 371 Date: Feb. 8, 1996

§ 102(e) Date: Feb. 8, 1996

[87] PCT Pub. No.: WO95/04977

PCT Pub. Date: Feb. 16, 1995

[30] Foreign Application Priority Data

Aug. 9, 1993 [DE] Germany ............................ 93112720.3
Nov. 19, 1993 [DE] Germany ............................ 43 39 534.1

[51] Int. Cl.[6] ...................................................... G06T 7/60
[52] U.S. Cl. ........................... 382/154; 382/288; 382/291; 395/358
[58] Field of Search ................................. 382/100, 103, 382/106, 107, 151, 153, 286, 287, 288, 289, 291, 154; 359/458; 414/1; 364/469.04, 559, 920.8; 348/77, 94, 95, 140, 171, 172; 356/12, 14, 375; 901/47; 395/119, 125, 137, 173, 358, 94, 99; 345/158

[56] References Cited

U.S. PATENT DOCUMENTS

| 4,748,676 | 5/1988 | Miyagawa et al. | 382/288 |
| 4,776,464 | 10/1988 | Miller et al. | 209/3.3 |
| 5,072,294 | 12/1991 | Engle | 348/172 |
| 5,285,273 | 2/1994 | James et al. | 348/169 |
| 5,452,370 | 9/1995 | Nagata | 382/153 |

FOREIGN PATENT DOCUMENTS

| 37 16 420 | 11/1987 | Germany . |
| 3718620 | 12/1987 | Germany . |

OTHER PUBLICATIONS

M. Celenk et al., Hypercube Concurrent Processor Implementation of a Position Invariant Object Classifier, IEE Proceedings–E, vol. 138, No. 2, Mar. 1991, pp. 73–78.
VC. Maggioni et al., "IM Handumdrehen", 202 Funkschau, vol. 66 (1994) 21 Jan., No. 3, Germany, pp. 82–87.
K. Hemmi et al., "3–D Natural Interactive Interface—Using Marker Tracking from a Single View", Systems and Computers in Japan, vol. 23, No. 11, 1992, pp. 62–73.
Z. Zhou et al., "Morphological Skeleton Transforms for Determining Position and Orientation of Pre–Marked Objects", IEEE Pacific RIM Conf. on Communications, Computers and Signal Processing, 1989, pp. 301–305.
Theo Pavlidis, Algorithms for Graphics and Image Processing, Bell Laboratories, Springer–Verlag, 1982, pp. 316–401.
M. Krueger, "Artificial Reality II", Addison–Wesley Publ. Co., 1991, pp. 101–207.
M. Clarkson, "An Easier Interface", Byte, Feb. 1991, pp. 277–282.
P. Wellner, "The DigitalDesk Calculator: Tangible Manipulation on a Desk Top Display", UIST '91, 1991, pp. 27–33.

Primary Examiner—Leo Boudreau
Assistant Examiner—Brian P. Werner
Attorney, Agent, or Firm—Hill & Simpson

[57] ABSTRACT

The images of an image sequence are put into binary form by applying a threshold value operation. The moments of the individual segments of each individual binary image of the binary image sequence are determined up to a prescribed order. Parameters which describe the position and rotational position of the segments in space are determined from the moments; the markings and their position and rotational position in space are determined with the aid of these parameters and the moments. Finally, the position and rotational position of the marked objects in space are determined using the known arrangement of the markings on the marked objects.

8 Claims, 3 Drawing Sheets

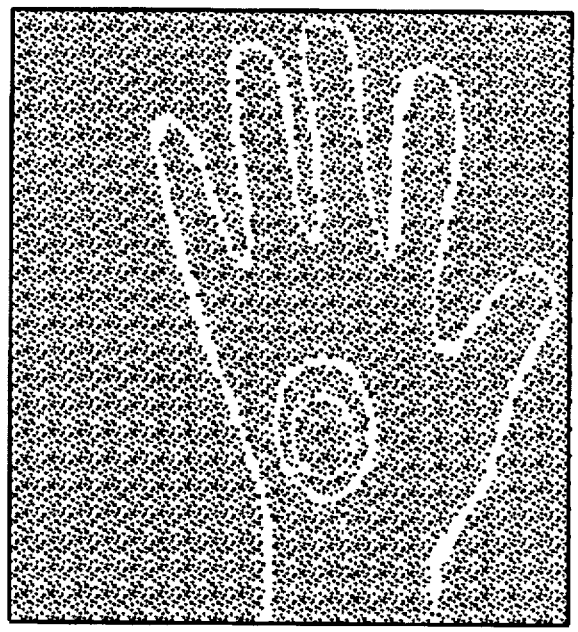
FIG. 4
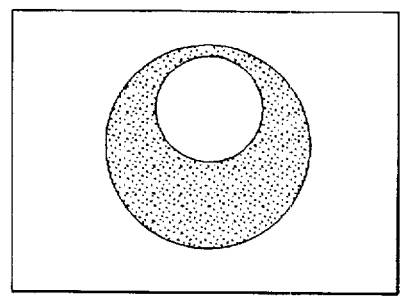
FIG. 5
FIG. 6
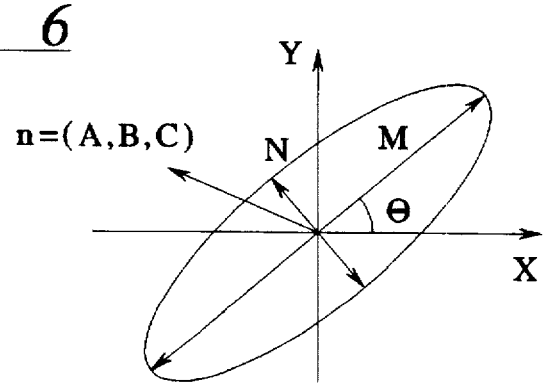

METHOD FOR DETECTING THE SPATIAL POSITION AND ROTATIONAL POSITION OF SUITABLY MARKED OBJECTS IN DIGITAL IMAGE SEQUENCES

BACKGROUND OF THE INVENTION

The invention relates generally to a method for detecting the spatial position and rotational position of suitably marked objects in digital image sequences, in particular also for detecting and tracking the movements of a human hand on which, for example with the aid of a glove specially produced for this purpose, suitable marks are provided.

DESCRIPTION OF RELATED ART

Such methods are required for controlling data processing systems or devices associated therewith with the aid of hand signals (gestures) in various fields of technology in which the simplest possible man-machine communication is important. In the article by M. A. Clarkson, An easier interface, BYTE 16 (2), February 1991, a description is given of "3D-Rooms", which is an impressive example of a three-dimensional system, an extension of the known two-dimensional "Desktop" user interfaces for the presently customary computers with a graphic user interface, which example particularly illustrates the value of three-dimensional input devices. A method for detecting the spatial position and rotational position of suitably marked objects in digital image sequences thus represents an important building block for future more user-friendly user interfaces for data processing systems.

Articles M. W. Krueger, "Artificial Reality II", Addison-Wesley, 1991; V. J. Vincent, Delving in the depths of the mind, Proc. Interface to real & virtual worlds, Montpellier, 1991; P. Wellner, The Digital Desk Calculator: Tangible Manipulation on a Desk Top Display, Proceedings of the ACM Symposium on User Interface Software and Technology (UIST '91), November 1991, Hilton Head, USA; and J. Segen, Gest: A learning computer vision system that recognizes gestures, to appear in Machine Learning 4, which are known from the literature and based on image processing all have the disadvantage that they can recognize only two-dimensional gestures and that it is necessary to assume a uniform image background with prescribed characteristics.

The German Patent document DE-A-37 18 620 discloses a method for determining an angle of rotation by means of a so-called inter-two-centroid method. However, this method presupposes knowledge of the position of the object and its rotational position in the other two directions in space. It can therefore detect only the rotational position about an axis and cannot detect spatial positions.

SUMMARY OF THE INVENTION

It is the object of the invention to provide a method for detecting the spatial position and rotational position of suitably marked objects in digital image sequences, which is not subject to these limitations, but permits the recognition of three-dimensional gestures against an arbitrary image background.

This and other objects and advantages are achieved according to the invention by a method for detecting the spatial position and rotational position of suitably marked objects in digital image sequences wherein structures arranged eccentrically relative to one another are used to mark the objects.

The images of an image sequence are put into binary form by applying a threshold value operation, as shown at 10 in FIG. 9. As a result of putting the image into a binary form, a binary image sequence is formed. The moments of the individual segments of each individual binary image of the binary image sequence are determined up to a prescribed order as shown at 20 in FIG. 9. Parameters which describe the position and rotational position of the segments in space are determined from the moments as shown at 30 in FIG. 9; the markings and their position and rotational position in space are determined with the aid of these parameters and the moments as shown at 40 in FIG. 9. Finally, the position and rotational position of the marked objects in space are determined using the known arrangement of the markings on the marked objects as shown at 50 in FIG. 9.

Advantageous developments of the invention provide that the contours of the individual segments of each individual binary image of the binary image sequence are determined and moments of these segments are determined from their contours.

Preferably, circular structures are used to mark the objects.

The threshold value which is used to put the image sequence into binary form is adapted, as a function of the continuously measured intensities of the pixels of the marking structures, to varying the lighting conditions of these structures.

The positions of the markings in later images are predicted from the observed values in earlier images, and these markings are searched for in suitably selected environments of their predicted positions.

The present method is used in a system for automatically recognizing gestures of a person who is operating a data processing system having a graphic user interface.

BRIEF DESCRIPTION OF THE DRAWINGS

FIG. 4 shows an image which is the result of the contour tracking illustrated in FIG. 3, with reference to the example of the image in FIG. 2.

FIG. 5 shows in a diagrammatic way a preferred embodiment of object markings as they can be used advantageously in conjunction with the method according to the invention.

FIG. 6 shows in a diagrammatic way a projected circle; that is to say an ellipse, with the major axes and further parameters.

DETAILED DESCRIPTION OF THE PREFERRED EMBODIMENTS

Figure 1:
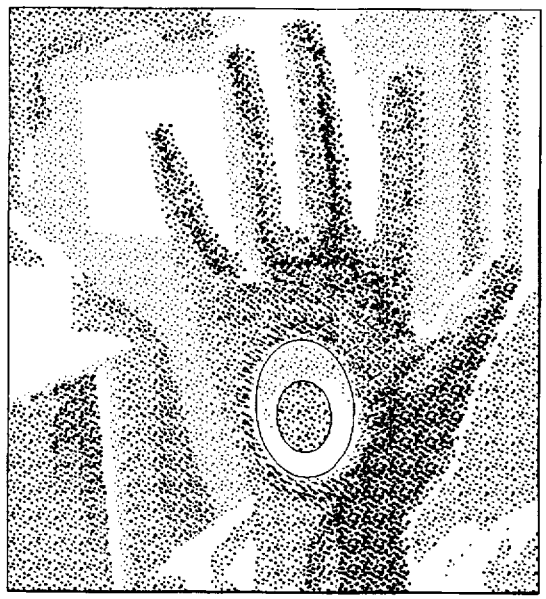
FIG. 1 shows a rastered gray-level image, taken by a CCD camera, of a human hand provided with markings for the purpose of carrying out the method according to the invention.

The invention is described below in more detail with the aid of preferred exemplary embodiments and of the figures.

The object of image processing in the case of the control of data processing systems with the aid of gestures of a human hand is to recognize the movements and gestures of the human hand. The method described below for this purpose can, however, be used beyond the sphere of recognizing hand gestures to include the detection of the spatial position and rotational position of arbitrary marked objects. The image processing methods used in this case must chiefly be independent with respect to interference in the image sequence material and independent with respect to fluctuations in the ambient brightness of the light and with respect to movements in the image background, and have at the same time a processing speed of between 10 and 25 images per second.

The speed of the image processing is particularly important in this case. Specifically, if the speed is too low, a large delay is produced between the hand movements of the user and the effects controlled thereby with respect to the application being controlled. It has been shown by experiment that in this case a reaction time of 1/10 second may not be exceeded, a reaction time of 1/25 second appearing to be optimum.

Owing to this restrictive requirement on the processing speed of the hardware used, the use of relatively expensive special hardware for image processing in real time, or else of very fast and yet efficient image processing algorithms, seemed to be unavoidable according to many of the publications in this field. The image processing algorithms described within the scope of this patent disclosure use application-specific knowledge to a large extent without, however, thereby limiting their general applicability. In a preferred exemplary embodiment of the methods according to the invention, a human hand and its movements are recognized in images which are taken with a gray-level, or gray scale, camera, the hand being specially marked by a black glove and markings provided thereon. Methods for image processing can be greatly simplified owing to the circumstance that the size and shape of these markings are known in advance.

In a gray-level image having a varying background, it is a very difficult problem to recognize a human hand in real time at this level of generality. This problem is substantially simplified when the hand stands out distinctly from the background and markings are provided on the hand whose shape and size are known. For this reason, it is advantageous in conjunction with the method according to the invention to use, for example, a black glove on which white markings are provided and which the user of the method according to the invention pulls over his hand. The image of the human hand is taken in this method with the aid of a gray-level camera, subjected to an adaptive threshold value operation and thus converted into a segmented binary image. Subsequently, features are calculated relative to all the image objects and with the aid of these features the markings are recognized and their position in space is calculated.

The images are taken, for example, with the aid of a CCD camera, which is preferably located on the computer monitor or in its vicinity. The camera is set up at the start of the method such that its taking zone corresponds to a spatial region which is comfortable for the user as concerns his hand movements. In trials, a zoom lens has proved to be useful for this, but is not mandatory.

The image delivered by the camera in the form of a video signal is, for example, digitized by a frame grabber and is subsequently available in the memory of the computer as a digital image, for example of size 512×512 pixels, each pixel being represented by an 8 bit long number which describes the gray level of this pixel.

FIG. 1 shows an example of a rastered gray-level image, on which a black hand with markings provided thereon is represented. Since the user aligns the camera as desired, the position of its optical axis in space cannot be detected immediately. Consequently, a calibration step will generally be needed after the camera has been set up. In this calibration step, the position of the optical axis of the camera is determined, for example, and the size of the markings is measured, for example, at a prescribed distance from the lens, with the result that the distance of the hand can be determined later with the aid of the size of the markings.

Figures 7, 8, 9:
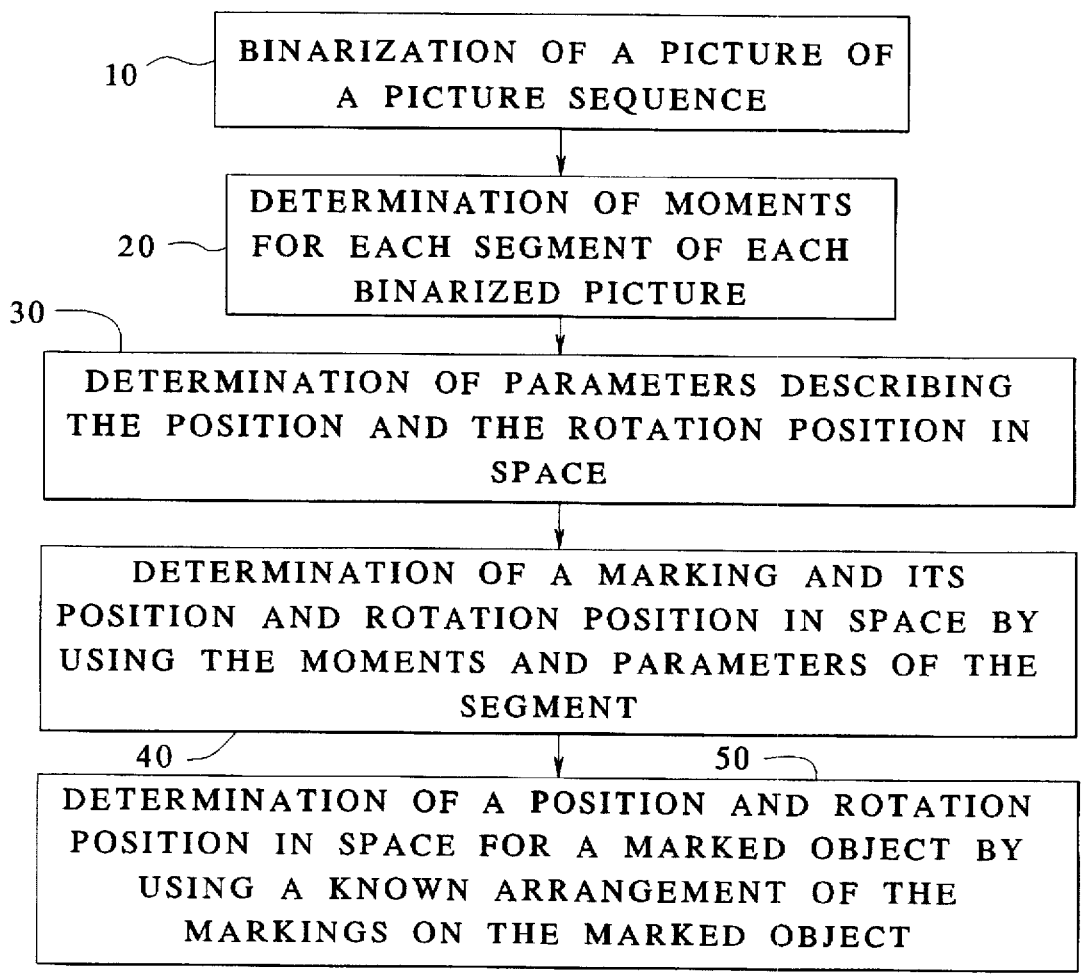
FIG. 7 shows in a diagrammatic way the adaptive threshold value formation with reference to the example of two circular, projected markings.
FIG. 8 shows in a diagrammatic way the restriction of the search area with the aid of movement estimation.
FIG. 9 is a block diagram showing an embodiment of the method steps of the present invention.

After taking the image of a human hand or of another moving object with the aid of a CCD camera, and the subsequent digitization and storage of this image in the computer, this gray-level image is put into binary form for the purpose of data reduction, as shown in FIG. 9 at step 10. A threshold used for this purpose is prescribed at the start or determined interactively and then matched adaptively to the existing lighting conditions. The adaptation of the threshold will be described later.

Figure 3:
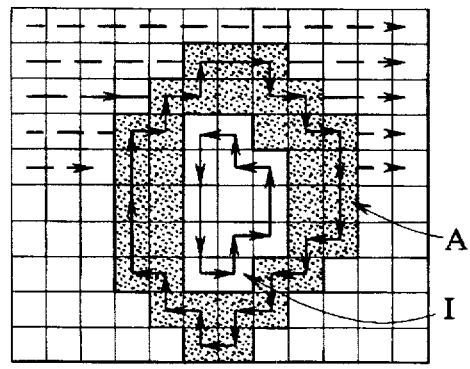
FIG. 3 shows a pixel grid in a diagrammatic way contour tracking of the contours of a binary segment such as is applied in a preferred embodiment of the method according to the invention.

The gray-level image taken by the camera is now further processed as a binary image with the aim of segmenting the markings provided on the object, for example on the hand. An algorithm as disclosed by T. Pavlidis in the publication "Algorithms for Graphics and Image Processing", Springer 1982, which is known per se, is applied for this purpose. The binary image is scanned line by line in this process. If a jump from 0 to 1, that is to say from dark to light, for example, is detected, and if the current pixel has not yet been located, the contour is traversed in the clockwise direction, the coordinates of the pixels being stored in a list and the pixels located in the process being marked as already processed. In the case of a jump from 1 to 0, the contour is scanned in the counterclockwise direction. At the end of this processing step, a list of the object contours is available in the memory of the computer, it also being known whether what is concerned is a black object on a white ground or vice versa. FIG. 3 illustrates contour tracking according to Pavlidis in a diagrammatic way.

Figure 2:
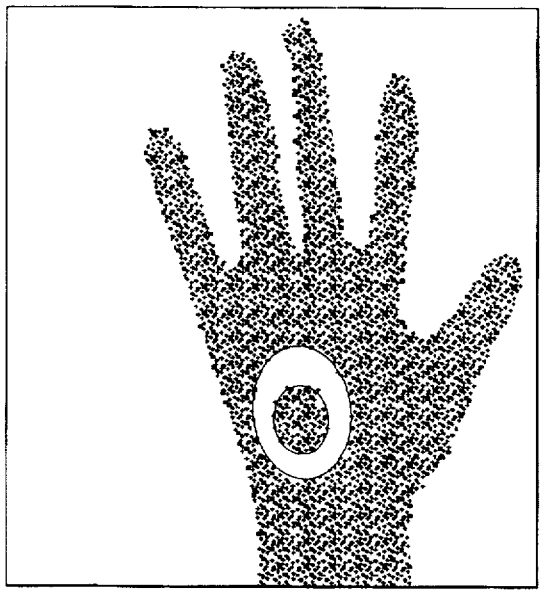
FIG. 2 shows the image of FIG. 1 in digitized form.

FIG. 4 shows the result of the contour tracking illustrated in FIG. 3, with reference to the example of the image in FIG. 2.

Further conduct of the method according to the invention requires the recognition of the marked objects independently of their position, size and orientation in space. Methods have been developed in image processing which permit the extraction from images of features which are invariant with respect to the abovenamed transforms. Particularly suitable for this purpose are the so-called moments which have been described, for example, in the publication by Zhou et al. "Morphological Skeleton Transforms for Determining position and orientation of Pre-Marked Objects", in IEEE Pacific Rim Conference on Communication, Computers and Signal Processing, pp. 301–305, 1989. The moment $m_{p,q}$ of order p,q of a function f(x,y) is defined here as $$m_{p,q} = \int_{-\infty}^{+\infty} \int_{-\infty}^{+\infty} x^p y^q f(x,y) dx dy$$

f(x,y) being, for example, the gray level of a pixel at the point (x,y). In the discrete form suitable for image processing, the definition of this moment is $$m_{p,q} = \sum_{x=1}^{M} \sum_{y=1}^{N} x^p y^q f(x,y) \Delta x \Delta y,$$

M and N denoting the number of pixels in the x- and y-directions, that is to say the image size. The moments defined above were defined for the case of gray-level images, no restrictive assumptions having been made for the range of values of the function f. In the case of the present method according to the invention, the images have already been put into binary form, and so f assumes only the binary values 1 or 0. Consequently, the definition of the moment is simplified to $$m_{p,q} = \sum_{x=1}^{M} \sum_{y=1}^{N} x^p y^q \Delta x \Delta y.$$

A striking interpretation can easily be assigned to the moments of low order in this case: the moment $m_{0,0}$ is equal to the area of an object. The quotients $m_{1,0}/m_{0,0}$ and $m_{0,1}/m_{0,0}$ specify the x- and y-coordinates, respectively, of the object centroid. With the aid of these centroid coordinates, the centroid of each object can be thought of as transformed into the origin. If the further moments are calculated with reference to this selection of the origin of coordinates, they are also termed central moments. The central moments are thus defined as follows:

$$\bar{m}_{p,q} = \sum_{(x,y)\in D} (x-\bar{x})^p (y-\bar{y})^q \Delta x \Delta y.$$

In order to calculate a moment, there is a need for exactly as many operations as there are pixels contained in the area of the object. The area of an object generally increases as the square of its size. However, it is possible with the aid of Green's theorem to transform the definition of the moments such that the moments of a set D (without internal holes) can be calculated only on the basis of its contour U. The number of pixels on the contour increases only linearly with the object size. The complexity and the computational outlay for calculating the moments are therefore reduced by an entire order of magnitude. If an object contains holes, the moments can be calculated nevertheless with the aid of Green's theorem if the boundary curves of the holes, traversed in the opposite direction to the outer boundary of the object, are treated as further components of the contour of the object.

Let D be a set and U its contour, in which case the moments of the set D can also be calculated as follows according to Green's theorem:

$$m_{p,q} = \sum_{(x,y)\in D} (a x^p y^{q+1} \Delta x + b x^{p+1} y^q \Delta y)$$

in which case the coefficients a and b must satisfy the equation $$b(p+1) - a(q+1) = 1.$$

Important special cases of this general formula are $$m_{p,q} = \frac{1}{p+1} \sum_{(x,y)\in B} x^{p+1} y^q \Delta y$$

or

-continued $$m_{p,q} = \frac{-1}{q+1} \sum_{(x,y)\in B} x^p y^{q+1} \Delta x.$$

In this case the outer contours must be traversed in the clockwise direction, and the inner contours—in the case of holes—must be traversed in the counterclockwise direction. In the case of the method according to the invention, the first three moments are calculated together with the contour tracking. In addition, the maximum extent of the objects in the x- and y-directions is determined. The higher central moments are calculated, to the extent required, in a second step as shown at 20 in FIG. 9.

In order to identify the marked objects, it is now necessary to find those objects which correspond to the markings. In a preferred exemplary embodiment of the method according to the invention, use is made of markings which are two circles which are arranged eccentrically relative to one another and of which one is as bright (white) as possible and the other as dark (black) as possible. This arrangement of the marking structures has the advantage that the entire arrangement is not rotationally invariant, and that perspective projections of this arrangement are easy to calculate. These properties of the preferred embodiment of the object markings are particularly suitable for the method according to the invention. The rotational position of the marked objects can thereby be detected in a particularly reliable fashion.

After the contour tracking and the calculation of the moments are concluded, various tests are carried out one after another in order to identify the markings in the image:

Since the size of the markings on the hand surface (or on the objects) is known, and since a minimum and maximum distance from the camera can easily be prescribed (for example 20 cm to 4000 cm), it is possible to specify a lower boundary for the area of these markings in the image. The moment $m_{0,0}$ specifies, however, precisely the area of the object. Thus, all the objects which are larger or smaller can be immediately sorted.

In order to determine the circularity, the maximum extent of the detected objects in the x- and y-directions is used as a rough guide in order to calculate the similarity of each object to a circle. Furthermore, a search is made for a large black object in which a smaller white object (or vice versa) is located and whose proportions lie within certain limits. The person skilled in the art can easily find still further and, possibly, better criteria for detecting the marking structures. However, it has been shown by experiment that it was virtually always possible by means of the criteria specified above to identify the markings uniquely in the image.

After the identification of the marking structures, the position of the centroids of the marking structures can be determined, as can therefore the position of the hand in space in the x- and y-directions via the known arrangement of the marking structures on the object (hand). Via the known area, the size of the marking structure specifies the distance from the camera and thus the position in the z-direction. The position of the object in space is therefore known.

Once the position parameters of the markings and thus of the object centroids have been determined in this way, the aim below is to determine the angles by which the object is arranged rotated relative to the three spacial axes. In order to determine these angles of rotation, use is made of the fact that the center of the inner circle of the marking shown in FIG. 5 and that of the outer circle are not centered with respect to one another, and of the circumstance that when projected in three dimensions a circle is transformed into an ellipse from whose parameters it is possible to derive the angle of projection. Thus, the parameters of an ellipse are to be determined and from this the angle of inclination of the plane of the circle relative to the plane of the image is to be calculated. Let the surface normal vector of the plane of the circle of the marking be n=(A,B,C), with the result that it holds for all points (x,y,z) on the circle in space that $$Ax+By+Cz=0,$$

the radius R of the circle being given by $$R = \sqrt{x^2 + y^2 + z^2} \ .$$

FIG. 6 illustrates in a diagrammatic way the geometrical parameters of a projected circle, that is to say an ellipse with the major and minor axes M and N, the angle θ which the major axis M forms with the x-axis, and the surface normal vector n. If the central moments of the object which corresponds to the ellipse are known, the major and minor axes M and N of this ellipse and the angle θ which the major axis M forms with the x-axis can be calculated in accordance with the formulae $$M = \frac{\tilde{m}_{2,0} + \tilde{m}_{0,2}}{2} + \sqrt{\left(\frac{\tilde{m}_{2,0} + \tilde{m}_{0,2}}{2}\right)^2 - (\tilde{m}_{2,0}\tilde{m}_{0,2} - \tilde{m}_{1,1}^2)}$$

$$N = \frac{\tilde{m}_{2,0} + \tilde{m}_{0,2}}{2} - \sqrt{\left(\frac{\tilde{m}_{2,0} + \tilde{m}_{0,2}}{2}\right)^2 - (\tilde{m}_{2,0}\tilde{m}_{0,2} - \tilde{m}_{1,1}^2)}$$

$$\theta = \frac{1}{2} \ \text{acrtan} \left[ -2 \frac{\tilde{m}_{1,1}}{\tilde{m}_{2,0} + \tilde{m}_{0,2}} \right].$$

Thus, only the moments up to the second order are necessary to calculate the major and minor axes and the angle. The following useful relationships hold between the parameters.

$$M = R \left[ 1 + \frac{(A\sin\theta + B\cos\theta)^2}{C^2} \right]^{\frac{1}{2}},$$

$$N = R \left[ 1 + \frac{(A\sin\theta - B\cos\theta)^2}{C^2} \right]^{\frac{1}{2}}$$

and $$A = -B \cdot \tan(\theta).$$

Transformation yields $$C = \frac{|A\sin\theta - B\cos\theta|}{\sqrt{\left(\frac{M}{N}\right)^2 - 1}}$$

and, because n is a normal vector, it holds that $$A^2 + B^2 + C^2 = 1.$$

The components A, B and C of the normal vector n can be calculated as follows with the aid of some transformations:

$$A = -B\tan\theta,$$

$$B = \sqrt{\frac{\left(\frac{M}{N}\right)^2 - 1}{(\tan\theta\sin\theta + \cos\theta)^2} + (\tan\theta)^2 + 1} \ ,$$

$$C = \sqrt{1 - A^2 + B^2} \ .$$

If the circular marking consists of two circular rings whose centers are displaced by (dx,dy) relative to one another, the rotation φ about the z-axis can be calculated as:

$$\phi = \arctan\left(\frac{dx}{dy}\right).$$

The parameters A and B must now be transformed in accordance with the z-axis rotation φ as follows:

$$\tilde{A} = A \cos\phi - B \sin\phi$$

$$\tilde{B} = A \sin\phi + B \cos\phi.$$

With respect to the rotation about the z-axis, after this transformation the ellipse is located in the normal position. As a result, the angles α for the rotations about the x-axis and β for the rotations about the y-axis are still to be calculated from the known surface normals $$n = (\tilde{A}, \tilde{B}, \tilde{C})$$

It is expedient for this purpose to transform the plane determined by n such that n subsequently lies parallel to the vector (0,0,1), that is to say parallel to the z-axis. Initially, there is a rotation about the x-axis, and this is followed by a rotation about the y-axis:

$$\alpha = \arccos\left(\frac{C}{\sqrt{B^2 + C^2}}\right) = \arcsin\left(-\frac{B}{\sqrt{B^2 + C^2}}\right)$$

$$\beta = \arccos(\sqrt{B^2 + C^2}) = \arcsin(-A).$$

The above rotations have to be applied in the reverse sequence in order to bring a model of the object or of the hand in the normal position, that is to say parallel to the xy-plane, into the position of the circular marking.

That is to say, the rotations are applied firstly about the y-axis, then the x-axis and finally about the z-axis.

In a preferred exemplary embodiment of the method according to the invention, it may be necessary for various reasons for the threshold used to put the recorded gray-level image into binary form to be determined anew continuously during the method. On the one hand, there are fluctuations in the ambient lighting (for example clouds, additional lamps), and on the other hand movements of the hand cause local brightness fluctuations on the marking structure itself. The latter point occurs, for example, in the case of ceiling lighting and an inclination of the hand about the x-axis. The fingers then cast a shadow onto the marking structure provided on the hand surface. It is therefore expedient for the purpose of overcoming these difficulties to adapt the threshold to brightness fluctuations in the light.

Use is made in this case of the fact that the ratio of the diameters of the two circles of the marking structure is known. A line is now calculated which runs through the two centers of the marking circles. Its starting point is the first intersection of the line with the outer marking circle and its end point is the second intersection. FIG. 7 illustrates the geometrical relationships in a diagrammatic way. Here, th denotes the threshold which is to be adapted, IC the center of the inner marking circle (represented as an ellipse, since projected) and UC the center of the outer marking circle. L denotes the line through the two centers. The n gray levels in the image along this line are now sorted into a field. If the outer marking circle is, for example, white, in the case of an optimum threshold n×r points must lie below the threshold and n×(1−r) points must lie above the threshold, r being the ratio of the diameter of the small marking circle to the diameter of the large marking circle. Such a threshold is precisely the nth element of the sorted gray-level field. The use of this threshold seems, however, not always to be optimum in the actual application, and instead of this it is possible in a preferred exemplary embodiment of the invention also to use the mean value of the average gray levels of the two clusters as a new threshold. The old digitization threshold is then changed in the direction of the newly calculated threshold:

$$th_{new} = th_{old} + \kappa \cdot (th_{opt} - th_{old}), \kappa \leq 1.$$

It sometimes happens that no marking structures can be found in individual images. In this case, it may be that, for example, the lighting has changed very strongly. Consequently, the threshold value formation is continued, for example using random numbers, after a specific number of images without a marking structure being found. If the marker is then successfully detected, the above-described mechanisms for threshold value adaptation come into force again. Once the marking structure has been found, it is frequently unnecessary to search the entire image plane in each of the following images for a marking structure. A search area is defined instead, and it is only in this search area that the steps of putting into binary form, contour tracking and object identification are carried out. Since the search area is typically small by comparison with the entire image, there is a significant reduction in the number of pixels to be investigated, and thus an increase in the computing speed.

FIG. 8 shows in a diagrammatic way the use of a restricted search area in conjunction with a simple form of movement estimation. The task of movement estimation is to predict where the marking will be located in the next image, in order to be able to position the center of the new search area there. For the purposes of the method according to the invention, a very simple type of movement estimation, a so-called linear predictor, is frequently entirely satisfactory. The speed of the marking structure is estimated from the last two images and it is assumed that the speed of the marking structure is approximately constant. As a result, its new position can be estimated in the following image and the search area can be centered there. Depending on the speed of the marking structure, the search area is enlarged, since in the case of a high speed of the hand the probability of sudden changes in direction and thus of disappearance from an excessively small search area increases. If the marking structure cannot be found in the established search area, the search area is enlarged in a plurality of steps until the marking can be found again, if appropriate until the search area comprises the entire image size.

Of course, it is also possible in conjunction with the method according to the invention to make use of other methods for movement estimation which, for example, also include in the determination of a new search area the estimated object speed and the acceleration, as well as knowledge relating to the detected object movement in general. Various methods for movement estimation which can advantageously be used in conjunction with the method according to the invention are known to the person skilled in the art from the literature.

Although other modifications and changes may be suggested by those skilled in the art, it is the intention of the inventors to embody within the patent warranted hereon all changes and modifications as reasonably and properly come within the scope of their contribution to the art.

We claim:

1. A method for detecting spatial position and rotational position of marked objects in real time digital image sequences, structures arranged eccentrically relative to one another being used as markings on the objects, comprising the steps of:
    a) putting images of a real time image sequence into binary form by applying a threshold value operation, as a result of which a binary image sequence is formed;
    b) determining moments of individual segments of each individual binary image of the binary image sequence up to a prescribed order;
    c) determining parameters which describe a spatial position and rotational position of the individual segments in space from the moments;
    d) determining the markings and their spatial position and rotational position in space with aid of the parameters and the moments;
    e) finally, determining the three-dimensional spatial position and rotational position of the marked objects in space using the known arrangement of the markings on the marked objects.

2. A method as claimed in claim 1, further comprising the steps of:
    determining contours of individual segments of each individual binary image of the binary image sequence and
    determining moments of said individual segments from said contours.

3. A method as claimed in claim 1, wherein circular structures are used to mark the objects.

4. A method as claimed in claim 1, wherein said step of putting further includes the step of:
    adapting the threshold value used to put the image sequence into binary form as a function of continuously measured intensities of pixels of the marking structures, to varying lighting conditions of the structures.

5. A method as claimed in claim 1, further comprising the steps of:
    predicting positions of the markings in later images from observed values in earlier images of said image sequence, and
    searching for the markings in suitably selected environments of the predicted positions.

6. A method as claimed in claim 1, further comprising the step of:
    using the position and rotational position of the marked objects in space in a system for automatically recognizing gestures of a person who is operating a data processing system having a graphic user interface.

7. A method as claimed in claim 1, wherein at least one of said marked objects is a hand.

8. A method as claimed in claim 1, wherein said steps a)–e) are performed on said image sequence in real time at a processing speed of at least 10 images per second.

* * * * *